United States Patent

[11] 3,540,615

| [72] | Inventors | T. O. Paine<br>Acting Administrator of the National<br>Aeronautics and Space Administration with<br>Respect to an Invention of;<br>James M. Stuckey, Decatur, Alabama;<br>Ralph A. Burkley, Cuyahoga Falls, Ohio and<br>Clem B. Shriver, Clinton, Ohio |
|---|---|---|
| [21] | Appl. No. | 795,217 |
| [22] | Filed | Jan. 30, 1969 |
| [45] | Patented | Nov. 17, 1970 |

[54] PANELIZED HIGH-PERFORMANCE MULTILAYER INSULATION
9 Claims, 7 Drawing Figs.

[52] U.S. Cl.................................................. 220/9,
52/249, 52/404; 62/45; 161/161
[51] Int. Cl..................................................... B65d 25/18
[50] Field of Search............................................ 220/91A, 9F,
9D, 83; 114/74A; 52/249, 406, 404, 309; 62/45;
161/161 Isocyanate

[56] References Cited
UNITED STATES PATENTS

| 1,972,508 | 9/1934 | Zeiner........................... | 52/249X |
| 2,485,647 | 10/1949 | Norquist....................... | 220/9D |
| 3,003,810 | 10/1961 | Kloote et al. ................. | 220/9F |
| 3,158,459 | 11/1964 | Guilhem....................... | 62/45 |
| 3,160,307 | 12/1964 | Morrison...................... | 220/9(F) |
| 3,317,074 | 5/1967 | Barker, Jr. et al .......... | 220/9(F) |
| 3,420,396 | 1/1969 | Bridges et al. ............... | 220/9(A1) |

Primary Examiner—Joseph R. Leclair
Assistant Examiner—James R. Garrett
Attorneys—L. D. Wofford, Jr., J. H. Beumer and G. T. Mc Coy ABSTRACT: An insulation structure for cryogenic containers comprising a plurality of prefabricated panels conforming to the shape of the container. The panels are secured together in edge-to-edge relationship to form at least two panel layers covering the container, with the panel edges in the respective layers being overlapped. Each of the panels is made up of multiple layers of metallized film radiation shields interleaved with layers of low conductivity foam sheet. The outer panel layer is covered with resin-impregnated fiberglass cloth to provide micrometeoroid protection.

Patented Nov. 17, 1970

RALPH A. BURKLEY
CLEM B. SHRIVER
JAMES M. STUCKEY
INVENTORS

BY
ATTORNEYS

Patented Nov. 17, 1970 3,540,615

RALPH A. BURKLEY
CLEM B. SHRIVER
JAMES M. STUCKEY
INVENTORS

BY

*ATTORNEYS*

Patented Nov. 17, 1970

RALPH A. BURKLEY
CLEM B. SHRIVER
JAMES M. STUCKEY
INVENTOR

BY
ATTORNEYS

3,540,615

PANELIZED HIGH-PERFORMANCE MULTILAYER INSULATION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457.

BACKGROUND OF THE INVENTION

This invention relates to thermal insulation and more particularly to high-performance insulation structures for cryogenic liquid containers.

One of the problems associated with the use of liquid hydrogen fuel and other cryogenic fluids for long term space applications is the provision of suitable thermal insulation for storage tanks. Liquid hydrogen has an extremely low boiling point, −423°F. at atmospheric pressure, and it will boil away rapidly unless stored in a well-insulated container. Cryogenic tank insulation for space applications must be effective not only under the vacuum conditions of outer space, but also under ordinary atmospheric conditions so as to minimize boiloff during periods of tank loading, prelaunch activities and ascent flight.

High-performance insulation, commonly referred to as superinsulation, has been developed previously for cryogenic liquid storage tanks, but the use of such insulation for space applications has presented difficulties in fabrication and installation and in meeting the additional performance requirements imposed. Previously known high-performance insulation utilizes multiple layers of a reflective radiation shield material such as aluminized Mylar or aluminum foil interleaved with layers of a porous, low thermalconductivity material such as finely divided, precompacted fiberglass, with the space between layers being evacuated for maximum efficiency. Fabrication of this type of insulation has been carried out by wrapping the respective layers around the tank or container and installing an outer wall or impervious sheet. This fabrication procedure requires extensive access to the part being insulated, and in most cases the insulation must be applied prior to positioning the insulated part in an assembly. For many applications such as in fabricating insulated cryogenic storage tanks for spacecraft, a prefabricated, panelized insulation structure which could be installed after placement of the part would provide a significant advantage.

For long term space applications the insulation structure should have a capability not required of previous insulation, that is, the ability to provide protection against damage and possible penetration of the tank by micrometeoroids. In addition, minimum weight is required, along with sufficient structural strength to withstand the severe vibration and heat encountered during launch and ascent flight. To enable adequate purging and evacuation, the insulation should also have good venting characteristics, and the previous insulation has frequently been deficient in this regard.

SUMMARY OF THE INVENTION

In the present invention high-performance multilayer insulation is prepared in the form of prefabricated panels conforming to the outer configuration of the insulated container. The panels are secured together in edge-to-edge relationship in at least two layers, with the panel edges in the respective layers being overlapped. Each of the panels is made up of multiple layers of metalized film radiation shields interleaved with layers of low conductivity foam sheet. The outermost panels are covered with an outer layer of relatively high-density material. The resulting structure exhibits highly efficient insulating characteristics along with micrometeoroid protection capability. Installation of the panelized structure is readily carried out, and the foam-type spacer material facilitates purging and evacuation. The foam spacer material further provides low-weight stabilization of the radiation shield density when external pressure is applied.

It is therefore an object of this invention to provide high-performance insulation in the form of lightweight, prefabricated panels that are resistant to compression from externally applied forces.

Another object is to provide an insulation structure capable of protecting cryogenic storage tanks from micrometeoroids in space.

Yet another object is to provide a cryogenic tank insulation structure which can be readily purged and evacuated.

Other objects, features and advantages of the invention will be apparent from the following detailed description.

DESCRIPTION OF THE PREFERRED EMBODIMENT

Figure 1:
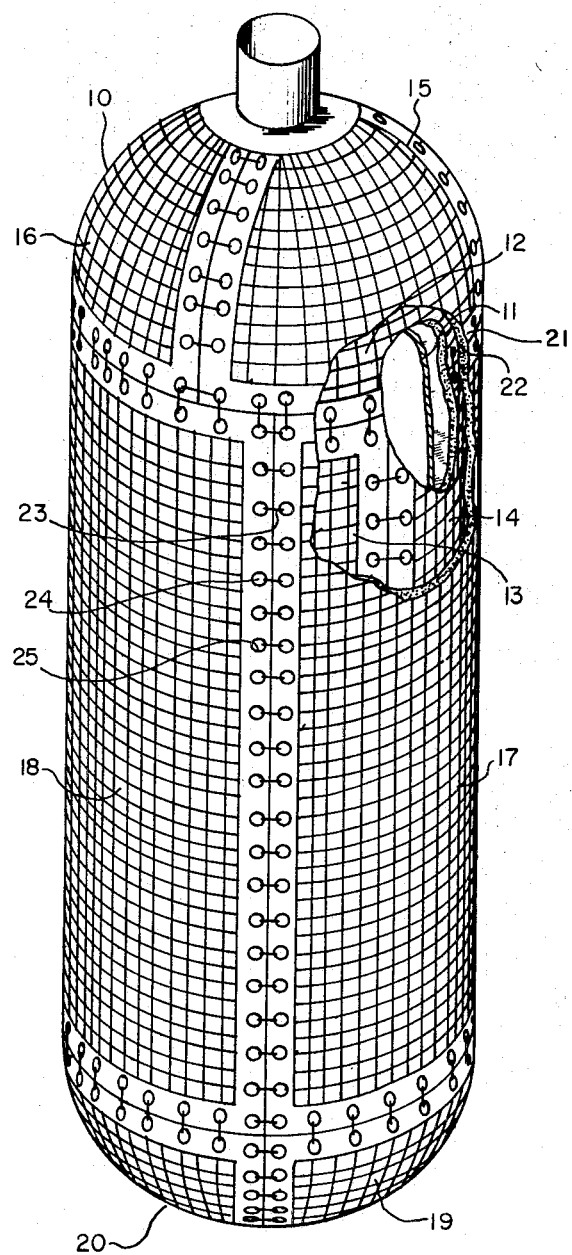
FIG. 1 is a perspective view, partially broken away, showing a cryogenic fuel tank covered with a panelized insulation structure embodying the invention.

Referring to FIG. 1 in the drawing, an insulated cryogenic fuel tank is generally designated by reference number 10. The metal tank wall 11 is covered by two layers of prefabricated panels, with inner panels 12, 13 and 14 and outer panels 15, 16, 17, 18, 19 and 20 being visible in this view. Each of the panels has edge bands 21 and 22 extending along the panel edges and secured to the outermost layer on the outer and inner surfaces, respectively, of the panel. The panels are held in position in an edge-to-edge relationship in each layer by means of a lacing cord or string 23 extending through openings 24 penetrating the edge bands 21 and 22. Metal eyelets 25 are secured in the edge bands 21 and 22 at the openings 24 to prevent damage to the panel by the lacings.

Figure 2:
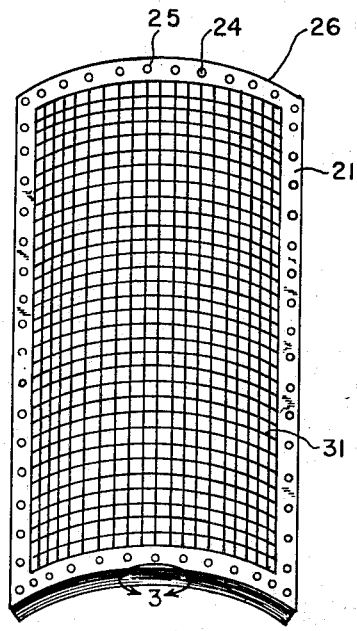
FIG. 2 is a perspective view of an individual insulation panel.
Figure 3:
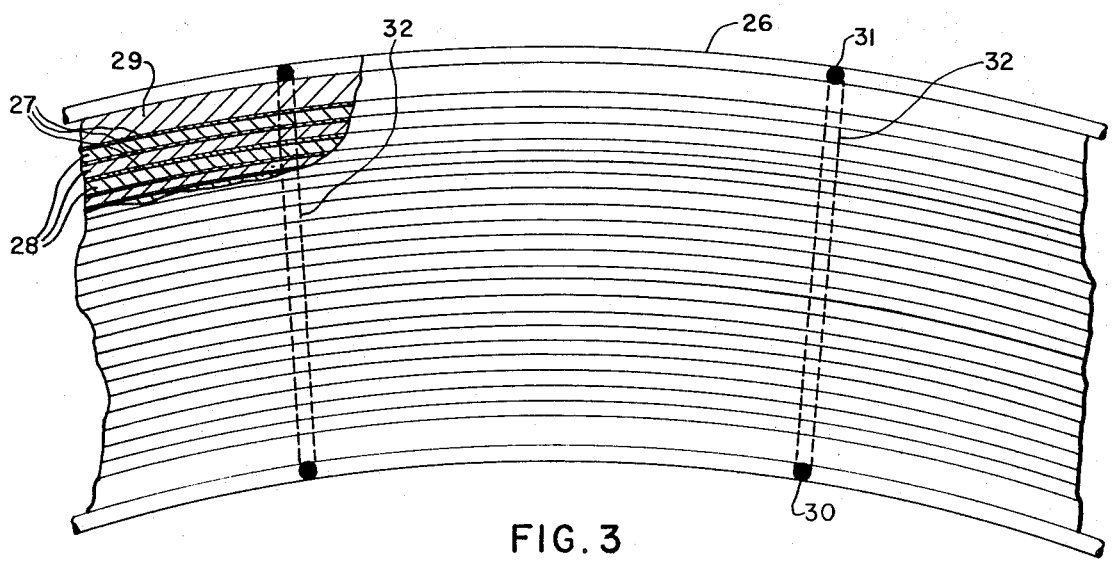
FIG. 3 is an enlarged, fragmentary cross section taken at the encircled area indicated by numeral 3 in FIG. 2.

As shown in FIG. 2 and FIG. 3, an individual panel 26 is made up of multiple layers of a metalized film radiation shield material 27 interleaved with sheets 28 of low conductivity foam spacer material. The outer surface of the panel is covered with a sheet 29 of high-density resin-impregnated fiberglass cloth which serves both as structural reinforcement and as a micrometeoroid protection bumper. The panel has fiberglass grid networks 30 and 31 outside the outermost layers on the inner and outer surface, respectively, to provide structural strength and dimensional stability. Drop threads 32 are used at suitable intervals through the panel to tie the networks 30 and 31 together.

Figure 4:
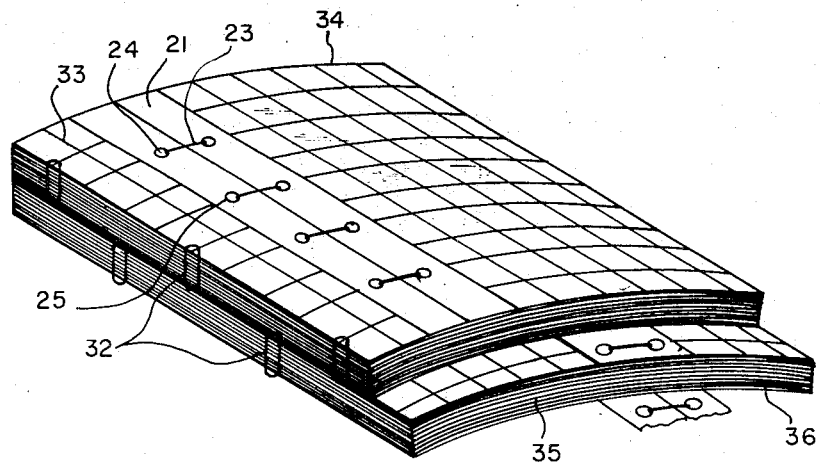
FIG. 4 is a perspective view showing portions of individual panels in overlapping relationship after assembly.

FIG. 4 shows a portion of an assembled panelized structure made up of outer panels 33 and 34 and inner panels 35 and 36. The joint between panels 33 and 34 is laterally spaced and thus overlapped from the joint between inner panels 35 and 36 so as to minimize radiant heat loss through the joints.

Figure 5:
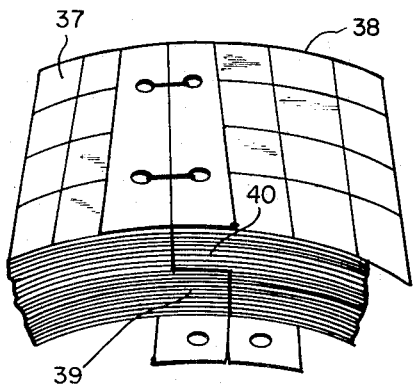
FIG. 5 is a perspective view showing an embodiment wherein the edges of adjacent panels are provided with interlocking extensions or steps.

FIG. 5 shows an alternative embodiment wherein the joint between adjacent individual panels 37 and 38 in the same layer is interlocked so as to further minimize radiant heat loss. Instead of a butt joint between panels, as shown in the above-described embodiment, a stepped joint is obtained by providing a lateral extension 39 of the inner portion of panel 37 and a lateral extension 40 of the outer portion of panel 38 mating therewith. The continuous path of radiant heat in the joint between panels is thus broken into two shorter paths. Additional steps can be provided if desired.

Figure 6:
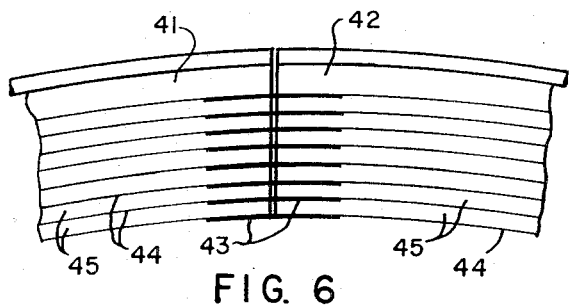
FIG. 6 is an end view of a panel joint area showing an embodiment employing interleaved strips at the joint between panels.

In the embodiment shown in FIG. 6 strips 43 of highly reflective metal foil or metalized plastic film are interleaved between radiation shields 44 and foam spacers 45 in adjacent panels 41 and 42 at the joint between panels. The metalized strips 43 extend along the entire length of the panel edges, and their width is such as to extend into the structure of both panels for a short distance. Radiant heat losses at the joints between panels are further reduced by this construction.

Figure 7:
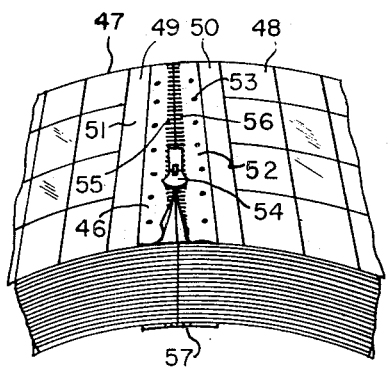
FIG. 7 is a perspective view of a panel joint area showing an alternate zipper method of panel attachment.

FIG. 7 shows another alternate embodiment wherein a zipper fastener 46 is used to secure the outer edges of adjacent panels 47 and 48. Backing strips 49 and 50 of the zipper fastener are joined to edge bands 51 and 52 by means of adhesive bonding and riveting with hollow rivets 53. A conventional slider 54 is used to close enmeshing zipper teeth 55 and 56. A similar fastener 57 secures the joint on the inner side. This embodiment is of particular value in controlling the gap between edge members on the back side of joined panels.

The number of panels used to make up the panelized structure is not critical, and the size of the individual panels will normally be determined by convenience of fabrication. Larger and more complex container configurations will require a larger number of panels. However, most of the cryogenic fuel tanks or containers for which the present insulation is intended will have a spherical or dome-ended cylindrical configuration. The panels are prefabricated to fit together in edge-to-edge relationship and form complete covering layers for the container, with the edges in adjacent layers being overlapped. Normally two layers of panels is sufficient, but additional layers can be used if desired. Each panel is preferably made up to a thickness of about ½ to 2 inches.

The insulating portion of the individual panels is made up of multiple layers of metalized film radiation shield interleaved with sheets of foam spacer material. A particularly suitable material for the radiation shield layers is .00015 to .00025 inch thick Mylar (polyethylene terephthalate) film coated on both sides with a 600 Angstrom unit thickness of aluminum. Other metalized thin film material can also be used. The critical requirements for this material are that it have a low emissivity and minimum thickness, consistent with sufficient strength for handling during panel fabrication.

The foam spacer material serves to minimize heat loss by conduction and to maintain the radiation shield layers in position. In addition the foam material furnishes an easy leak path for escape of gases between radiation shields and thus enhances purging and evacuation. The foam spacer can be any foamed plastic material, and polyurethane foam is preferred. Suitable polyurethane foam is available in the form of thin sheet material having a relatively low density of 1.0 to 2.0 pounds per cubic foot. This material is advantageous over the various fibrous materials previously used for spacer applications in that the foam material is lighter, tougher and available in thin sheets. A foam sheet thickness from 0.020 to 0.040 inch can be used. Thinner sheets are difficult to handle without tearing, and thicker sheets unduly increase the weight and bulk of the panel structure without providing any advantages. An example of suitable foam sheet material is available commercially under the designation "Zer-O-Cel NB Red". This material is prepared by cutting or slicing of polyurethane foam in block form.

Alternating layers of radiation shield and foam spacer are stacked to the desired thickness, with the outermost layers being the radiation shield material. Depending on the foam spacer thickness, about 22 to 27 radiation shields are employed per inch of panel thickness.

The panels for the outermost panel layer are covered with an outer layer of relatively high density material to provide protection from micrometeoroids in space. High velocity particles are shattered upon impact with this layer so that the resulting fragments can be absorbed by inner layers in the panel structure. A relatively high-mass material is required for this purpose, and resin-impregnated fiberglass cloth is preferred, although other materials such as metal sheet can also be used. The thickness and density of the outer protective layer will depend on the degree of micrometeoroid protection desired, but for typical applications a density of 0.06 to 0.11 pounds per cubic inch and a thickness of 0.015 to 0.030 inch can be used. Examples of suitable fiberglass cloth for this purpose include Glass Cloth-Style 181, Volan A Mil-C-9084 and Glass Cloth-Style 182, Volan A Mil-C-9084. The fiberglass cloth is impregnated with resin such as polyurethane, epoxy, polyester, phenolic, silicone or the like and is hardened by an appropriate curing cycle. Examples of suitable resins include polyurethanes such as Adiprene L-100/MOCA.

The stacked layers of radiation shields and foam spacers, and for the outer panel structure, the outer layer of resin-impregnated fiberglass cloth, or other high density material as described above, are covered with a network or grid pattern of rovings made of fiberglass or other high-strength material to provide structural strength, dimensional stability and a means for securing the layers together within the panel. A network of continuous 8 to 20 end fiberglass rovings in a hardened matrix system and disposed in a square pattern ½ to 4 inches between rovings can be used.

Each of the panels has edge bands, preferably about one inch wide, running along all of the edges on the inner and outer surfaces to maintain the panel edges firmly in position. The edge bands can be made of resin-impregnated fiberglass cloth prepared in the same manner as the outer fiberglass cloth layer. Two layers of edge bands are provided for maximum structural integrity, one layer above and one below the network or grid material. Openings reinforced with metal eyelets are disposed at the desired interval, normally 2 to 3 inches apart, for introduction of thread or other lacing material to enable assembly of the panel structure.

At spaced intervals in each panel, and preferably about 4 inches apart, drop threads, which can be nylon, Dacron or the like, secure the panel together, the threads being passed through the multilayered structure and tied to the grid network at intersections therein.

Fabrication of panels for the panelized structure of the present invention is carried out by stacking of the interleaved material layers and supporting components on a mold or form conforming to the outer shape of the tank or container. The mold or pattern should have a smooth surface and for panel assembly purposes should have openings at intervals corresponding to the desired location of drop threads so as to enable tying of the drop threads through the panel. The fiberglass roving grid network and edge band is formed by laying up strips of resin-impregnated fiberglass cloth and resin-impregnated fiberglass roving on a smooth mold surface in a prescribed pattern. Normally the high strength fiberglass rovings are oriented in relation to the longitudinal and circumferential directions of the tank wall with the edge band material forming a perimeter for the overall network of grids formed. To properly secure the fiberglass rovings in the edge band the rovings are sandwiched between two matching edge band strips. The resulting grid layup is then vacuum bagged and heated to cure the resin-impregnated cloth strips and fiberglass rovings at a suitable curing cycle, for example, 200°F. for one hour and 285°F. for two hours for strips impregnated with epoxy resin. A companion grid layup is then prepared in the same manner. For panels to be used in the outer panel layer, a layer of resin-impregnated fiberglass cloth is prepared to conform to the shape of the panel outer grid contour. Panel assembly is accomplished by stacking alternate layers of radiation shield and foam spacer material to the desired thickness on an inner grid layup which is supported on a suitable mold surface.

For compound curved panels such as for domed end portions the layers or sheets are slitted or cut into gore sections as required for fitting the mold. The cuts or slits in the radiation shields should be overlapped in adjacent layers to minimize the creation of heat leak paths through the panel. The outer grid layup is placed on the stacked assembly, which will include an outer layer of resin-impregnated fiberglass cloth for the outer panel layer. Drop threads are passed through the panel and tied to intersections in the roving networks. The drop threads should first be impregnated with resin such as polyurethane. Excessive tightening of drop threads is to be avoided to prevent a "quilted" appearance of the panel surface, and knots should be positioned so as not to locally depress the insulation. The edges of the panel are cut and trimmed as required for a smooth fit. The panels are installed on the tank or container to be insulated by inserting eyelets in the side bands and securing adjacent edge bands together with lacings extending through the eyelets. Another means of securing adjacent edge bands together is by the use of zippers attached to the edge band strips. This method of joining edge bands is particularly useful in securing the back side grid network of panels.

For efficiency under atmospheric conditions the panelized insulation assembly can be evacuated by surrounding it with a vacuum jacket or bag connected to a suitable vacuum source. However, owing to the difficulty of maintaining the desired high vacuum, it is preferred to purge the jacketed assembly with gaseous helium under ground atmospheric conditions and to allow the helium to escape in space. Helium vents readily from this insulation structure at a pressure differential of 2 to 5 pounds per square inch, which venting characteristic is favorable for essentially complete evacuation in space. Tests under simulated space conditions using a 30-inch diameter liquid hydrogen tank insulated with a double-layer panel structure prepared in accordance with the preferred procedure given above show an average system heat leak($Q$) of less than 0.15 Btu/hr-ft$^2$ when using liquid hydrogen as the cryogen.

In addition to providing effective insulation for prolonged use of cryogenic fuel tanks in space missions, the insulation structure described above will protect fuel tanks from penetration by micrometeoroids. In micrometeoroid penetration tests conducted by impacting 17 and 70 milligram Pyrex particles into the panelized structure at velocities of 22,000 to 26,000 feet per second the particles did not penetrate through the entire structure, but only the outer layers thereof, in addition the panelized structure will withstand the severe vibration and heat conditions encountered during launch and ascent flight of launch vehicles.

Although preferred embodiments of the invention have been described above in detail, it is to be understood that modifications and variations may be employed without departing from the spirit and scope of the invention, which is limited only as indicated by the appended claims.

We claim:

1. A thermally insulated cryogenic fluid container comprising:
   a. a container wall;
   b. a prefabricated panel structure contiguous with and covering the outer surface of said container wall;
   c. said prefabricated panel structure including at least two panel layers;
   d. each of said panel layers comprising a plurality of panels secured together in edge-to-edge relationship and enclosing said wall;
   e. said panels comprising an inner grid network, an insulating portion made up of a stacked array of alternating sheets of metalized foil radiation shields and foam spacer material, an outer grid network and tie means penetrating said insulating portion at spaced intervals and securing said inner grid network to said outer grid network;
   f. the outermost of said panel layers being covered with a layer of relatively high density material.

2. The invention as defined in claim 1 wherein said radiation shields are thin sheets of aluminized Mylar.

3. The invention as defined in claim 2 wherein said foam spacer material is a polyurethane foam sheet.

4. The invention as defined in claim 1 including edge bands disposed along the edges of said panels, said edge bands having eyelets therein for securing adjacent panels together.

5. The invention as defined in claim 1 including edge bands disposed along the edges of said panels and zipper fasteners attached to said edge bands for securing adjacent panels together.

6. The invention as defined in claim 1 wherein said relatively high density material is resin-impregnated fiberglass cloth.

7. The invention as defined in claim 1 including a gas-impermeable purging jacket enclosing said panel structure.

8. The invention as defined in claim 1 wherein said panel edges are stepped so as to provide an interlocking fit between adjacent panels in the same layer.

9. The invention as defined in claim 1 including strips of radiation-reflecting material interposed at the joints between adjacent panels in the same layer, said strips being interleaved between radiation shields in both the adjacent panels.